United States Patent [19]
Koyama et al.

[11] Patent Number: 5,388,092
[45] Date of Patent: Feb. 7, 1995

[54] ECHO CANCELLER FOR TWO-WIRE FULL DUPLEX DIGITAL DATA TRANSMISSION

[75] Inventors: Tetsu Koyama, Tokyo; Kazuhiko Aizawa, Miyagi, both of Japan

[73] Assignee: NEC Corporation, Japan

[21] Appl. No.: 149,705

[22] Filed: Nov. 9, 1993

Related U.S. Application Data

[63] Continuation of Ser. No. 543,979, Jun. 26, 1990, abandoned.

[30] Foreign Application Priority Data

Jun. 27, 1989 [JP] Japan .................. 1-166081

[51] Int. Cl.⁶ .............................................. H04B 3/23
[52] U.S. Cl. .............................. 370/32.1; 379/411
[58] Field of Search ............... 370/32.1, 24, 29, 13, 370/26, 32; 381/29, 24; 379/410, 406, 408, 411; 375/14, 12, 103; 333/18, 28 R

[56] References Cited

U.S. PATENT DOCUMENTS

| | | | |
|---|---|---|---|
| 4,535,206 | 8/1985 | Falconer .................. | 370/32.1 |
| 4,697,261 | 9/1987 | Wang et al. .............. | 374/410 D |
| 4,769,808 | 9/1988 | Kanemasa et al. ......... | 370/32.1 |
| 4,805,215 | 2/1989 | Miller .................... | 370/32.1 |
| 4,852,081 | 7/1989 | Bonnet et al. ............ | 370/32.1 |
| 4,918,685 | 4/1990 | Tol et al. ................ | 370/32.1 |
| 4,920,530 | 4/1990 | Wouda et al. ............. | 370/32.1 |
| 4,965,786 | 10/1990 | Salle .................... | 370/32.1 |
| 5,008,923 | 4/1991 | Kitamara et al. .......... | 370/32.1 |
| 5,029,204 | 7/1991 | Shenoi et al. ............ | 370/32.1 |
| 5,042,026 | 8/1991 | Koike et al. ............. | 370/32.1 |

OTHER PUBLICATIONS

A new digital echo canceler for two-wire full-duplex data transmission, Kurt H. Mueller, vol. COM-24, No. 9, pp. 956–963, Sep. 1976.

Primary Examiner—Douglas W. Olms
Assistant Examiner—Dang Ton
Attorney, Agent, or Firm—Laff, Whitesel, Conte & Saret

[57] ABSTRACT

An echo canceller comprises an adaptive digital filter and a low frequency component suppresser. The canceller is used for two-wire full duplex digital data transmission system. The adaptive filter comprises a transversal filter with plural number of taps for generating an echo replica signal by adaptively estimating the time-varying transfer characteristics of an echo path in order to suppress the echo signal from the echo path. The low frequency component suppresser is installed in parallel with the adaptive filter to effectively increase the number of taps of the transversal filter, and to suppress the level of the low frequency component contained in a residual echo signal which is the difference between the echo signal and the echo replica signal at tail portion of the impulse response of the echo replica signal. Due to the low frequency component suppresser, the number of taps of transversal filter is considerably decreased and the arithmetic operation is greatly reduced.

3 Claims, 4 Drawing Sheets

ECHO CANCELLER FOR TWO-WIRE FULL DUPLEX DIGITAL DATA TRANSMISSION

This application is a continuation of application Ser. No. 07/543,979, filed Jun. 26, 1990, now abandoned.

BACKGROUND OF THE INVENTION

The present invention relates to an echo canceller and, more particularly, to an echo canceller for two-wire full duplex digital data transmission system.

Generally, a data transmission system is either two-wire or four-wire system, where "two" and "four" stand for the numbers of physical transmission media directly connected to data circuit terminating equipment (DCE). In a two-wire transmission system, the bidirectional data transmission is performed by a pair of transmission lines having no directivity. On the other hand, in a four-wire transmission system, it is performed by two independent pairs of unidirectional transmission lines. Moreover, the data transmission system has two types of operational modes, that is, full duplex and half-duplex transmission modes. The full duplex transmission means simultaneous transmission in both directions by means of same transmission path, while the half duplex transmission means the alternate transmission in both directions by time-divided use of the same transmission path. It is well known that in order to install a long-distance data transmission system, the two-wire full duplex is superior than four-wire full duplex and two-wire half duplex modes in view of installation cost and transmission efficiency. By two-wire full duplex data transmission system, the speech, data and facsimile communication services have been provided in the forms of analogue signal. Recently, these services are provided also in the forms of digital signal.

On the other hand, the evolution of digital technique promotes the digitalization of telephone exchanger and transmission system. Consequently, an integrated services digital network (ISDN) is developed, by which various communication services, such as speech, data and facsimile communications, are provided by a single digital network integrated by digital facilities. By means of ISDN system, the economization of facilities, such as telephone exchanger and transmission path, can be attained. Moreover, the transmission quality can be improved, because the direct digital terminal-to-terminal transmission is available.

In order to receive the various services from ISDN, it is preferable from the consideration of the efficient use of transmission path that the user can access the ISDN through two-wire full duplex digital transmission path. However, the two-wire full duplex digital data transmission requires an echo canceller, by which echoes generated in the transmission path are suppressed by digital signal processing technique.

A conventional echo canceller suitable for two-wire full duplex digital data transmission system comprises an adaptive digital filter composed of a transversal filter. In the echo canceller of the kind, an echo replica is generated by estimating adaptively the time-varying transmission characteristics of echo path by means of adaptive filter, and then the echo component is cancelled by subtracting echo replica from a received signal containing echo signal generated in echo path. Generally, the estimation of tap coefficients of the adaptive filter employs the mean square error algorithm, which is expected to relatively stably converge.

An example of the echo canceller of the kind is described in U.S. Pat. No. 4,087,654. However, the conventional echo canceller has the following difficulty. Namely, the impulse response of echo canceller is not finite, but lasts indefinitely with exponential decay, the time constant of which is determined by the impedance of a hybrid transformer and the matching impedance constituting a hybrid circuit. The residual echo signal at echo tail portion not cancelled by echo canceller contains the low frequency component of several tens Herz, which becomes low frequency noise to degrade the communication quality. In order to assure the required suppression of residual echo by cancelling the low frequency component existing during long time interval, it is usually necessary to select the number of taps of adaptive filter to be 64 or more. In detail, the residual echo $r_n$ is given by eq. (1), $$r_n = \sum_{k=N+1}^{\infty} A\, a_{n-k} \alpha^k, \qquad (1)$$

where N denotes the number of taps of adaptive filter, $\{a_n\}$ denotes the transmitted symbol, while A and $\alpha$ denote amplitude and decaying rate of echo tail, respectively. The noise power $N_{PE}$ due to residual signal $r_n$ is given by eq. (2), $$\begin{aligned}
N_{PE} &= E\{r_n^2\} \qquad (2)\\
&= E\left\{ \left(\sum_{k=N+1}^{\infty} A\, a_{n-k}\alpha^k\right)^2 \right\}\\
&= E\left\{ \sum_{k=N+1}^{\infty} A^2\, a_{n-k}^2 \alpha^{2k} \right\}\\
&= E\{a_n^2\}\left\{ \sum_{k=N+1}^{\infty} A^2\, \alpha^k \right\}\\
&= E\{a_N^2\}\, A^2\, \frac{\alpha^{2(N+1)}}{1-\alpha^2}
\end{aligned}$$

In a practical system, the average transmission power of 2B1Q (2 binary 1 quaternary) symbol is $E\{a_n^2\}=5$ V, assuming that the transmission signal level for symbol +1 is 1 volt, while amplitude and decaying rate of echo tail are $A^2 = 3.7 \times 10^{-6}$ and $\alpha = 0.969$, respectively. The received signal power $S_P = 0.0005$, if the loss in the transmission path is considered. In order to guarantee S/N ratio of 20 dB, the noise power level should be $N_{PE} < S_P/100 = 0.000005$. Thus, the eq. (2) gives the number of taps $N<64$.

Consequently, as the number of taps of adaptive filter increases, the hardware structure and the computation indispensably increase.

SUMMARY OF THE INVENTION

An object of the present invention is to provide an echo canceller for two-wire full duplex digital data transmission system, wherein the cancellation of low frequency component contained in the residual echo signal is attained by such simple construction that the number of taps of adaptive digital filter is considerably decreased.

Another object of the present invention is to provide an echo cancellor for two-wire full duplex digital data transmission system, wherein the quantity of computation to cancel the low frequency component contained in the residual echo signal is considerably decreased.

An echo canceller for two-wire full duplex digital data transmission system according to an embodiment of the present invention comprises an adaptive digital filter containing a transversal filter with a plurality of taps for generating an echo replica by estimating adaptively the time-varying transmission characteristics of echo path to cancel the echo signal from the echo path. Moreover, the echo canceller comprises a low frequency component, suppresser circuit installed in parallel with the adaptive digital filter, which effectively increases the number of taps of the transversal filter, and which cancels the low frequency component contained in the residual echo signal.

BRIEF DESCRIPTION OF THE DRAWINGS

The above and other objects and feature of the invention may be fully understood from the following detailed description and the accompanying drawings, in which.

In the drawings, identical numbers denote identical structural elements.

DETAILED DESCRIPTION OF THE PREFERRED EMBODIMENTS

Figure 1:
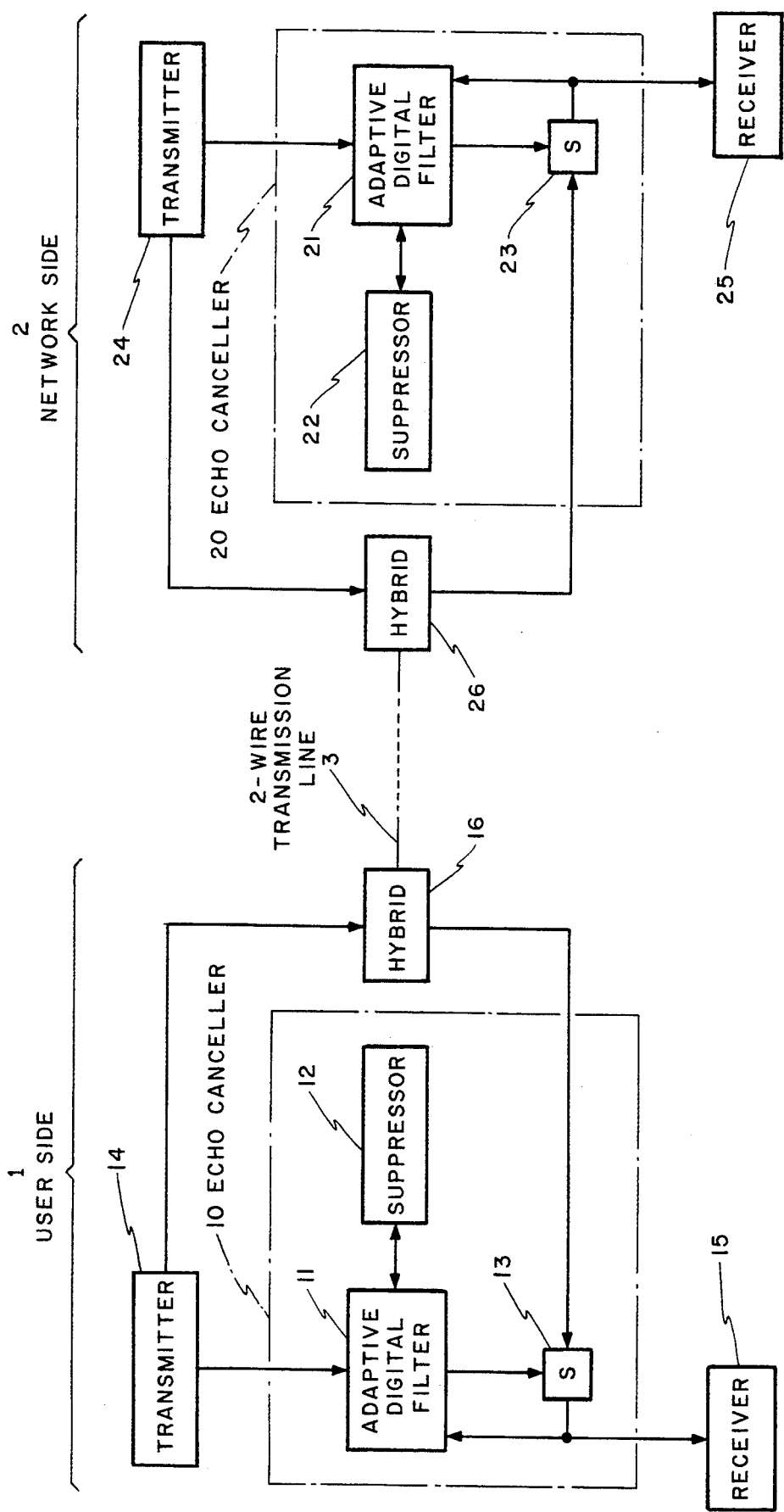
FIG. 1 shows the first embodiment of the present invention.

Referring to FIG. 1, a two-wire full duplex digital data transmission system according to the first embodiment of the present invention is shown. In this digital data transmission system, a user side 1 is installed in terminal equipment (network termination 1 (NT1) in CCITT recommendation I.411) in a subscriber's house. The user side 1 comprises an echo canceller 10 including an adaptive digital filter 11, a low frequency component suppresser 12 and a subtracter 13; a transmitter 14; a receiver 15; and a hybrid circuit 16. The user side 1 is connected either directly to ISDN interface terminal equipment (not shown) (terminal equipment 1 (TE1) in CCITT recommendation I.411) through transmitter 14 and receiver 15, or indirectly to it through a network termination (not shown) (network termination 2 (NT2) in CCITT recommendation), such as PBX (private branch exchange) and LAN (local area network).

On the other hand, a network side 2 is installed in a line terminator of ISDN (line terminator (LT) in CCITT recommendation G.960). The structure of the network side 2 is the same as user side 1, that is, which comprises: an echo canceller 20 including an adaptive filter 21, a low frequency component suppresser 22 and a subtracter 23; a transmitter 24 and a receiver 25 connected to a communication network of ISDN (not shown); and a hybrid circuit 26.

The hybrid circuit 16 at user side 1 and hybrid circuit 26 at network side 2 are mutually connected to each other through two-wire transmission line 3 used as subscriber line. The full duplex communication is available by transmission line 3.

In the forementioned two-wire full duplex digital data transmission system, an ISDN interface terminal, such as telephone terminal, data terminal and facsimile terminal, housed in user side 1 can communicate to a desired terminal through ISDN network connected to network side 2. In this communication process, an echo signal generated in the transsission path between terminals is suppressed together with low frequency component of residual echo signal by means of echo cancellers 10 and 20, as is described later.

Figure 2:
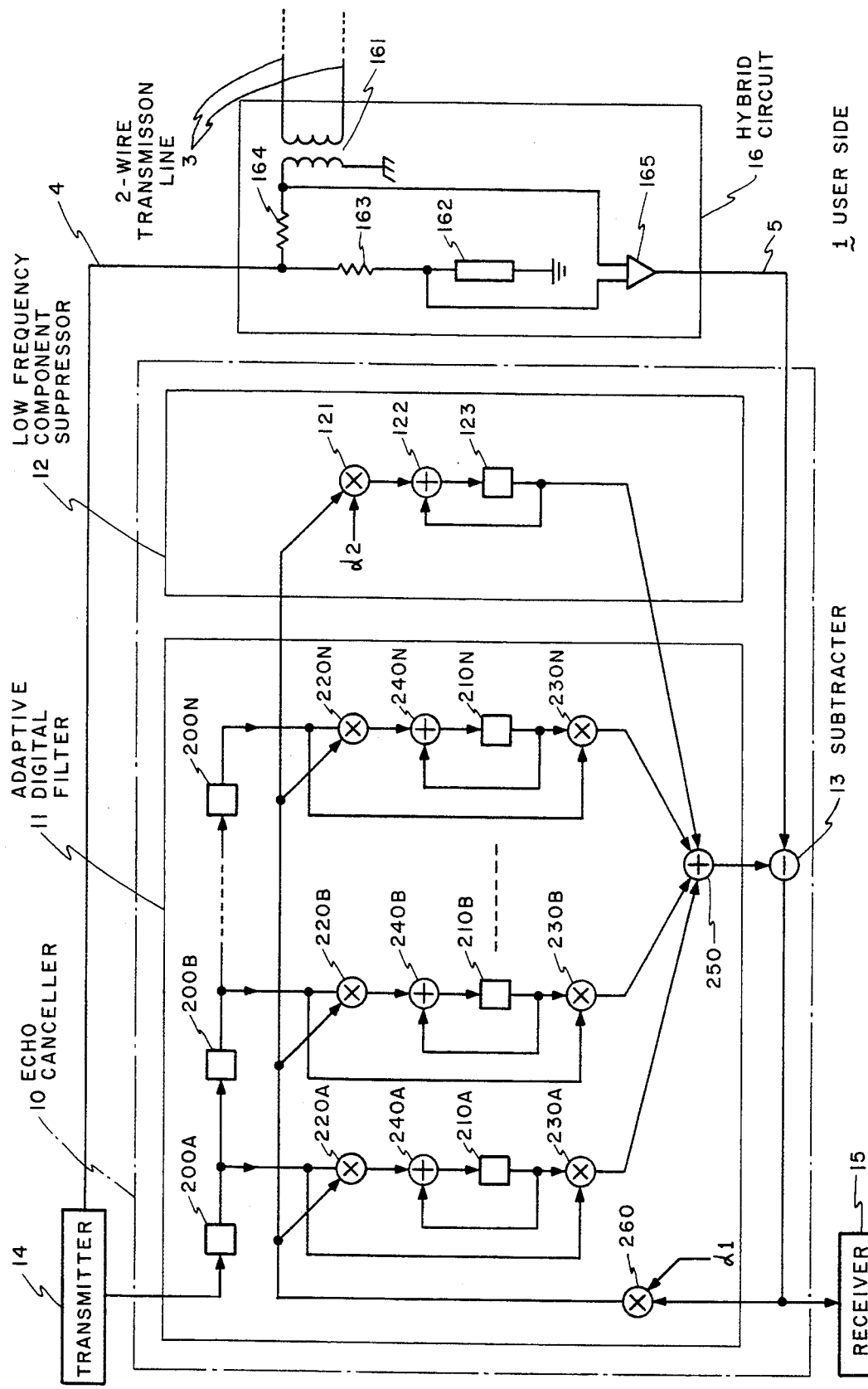
FIG. 2 is a circuit diagram showing the detailed construction of the echo cancellor and hybrid circuit in FIG. 1.

Now, the echo suppression process will be explained with reference to FIG. 2, which shows the detailed constructions of the echo canceller 10 and hybrid circuit 16 in FIG. 1. Since the echo suppression process by echo canceller 20 in FIG. 1 is the same as that of echo canceller 10, the explanation about it will be omitted. In the echo canceller 10, the adaptive digital filter 11 is a transversal filter with 30 taps. The filter 11 comprises the unit delay elements 200A, 200B, ... 200N, each of which is constructed by a register, and the registers 210A, 210B, ... 210N respectively storing the tap coefficients, which are updated succeedingly from initial values under the adaptive control. Moreover, the filter 11 comprises the multipliers 220A, 220B, ... 220N and the adders 230A, 230B, ... 230N in order to update the tap coefficients stored in registers 210A, 210B, ... 210N. Also, the filter 11 comprises an adder 250 to obtain an echo replica of the echo generated in echo path of transmitter 14 by summing the outputs of the multipliers 230A, 230B, ... 230N, and a multiplier 260 to scale the echo replica. Although the structure of the filter 11 is substantially similar to the conventional digital filter, its feature exists in that the number of taps is decreased to 30, which is generally considered to be 64 or more.

Figure 4:
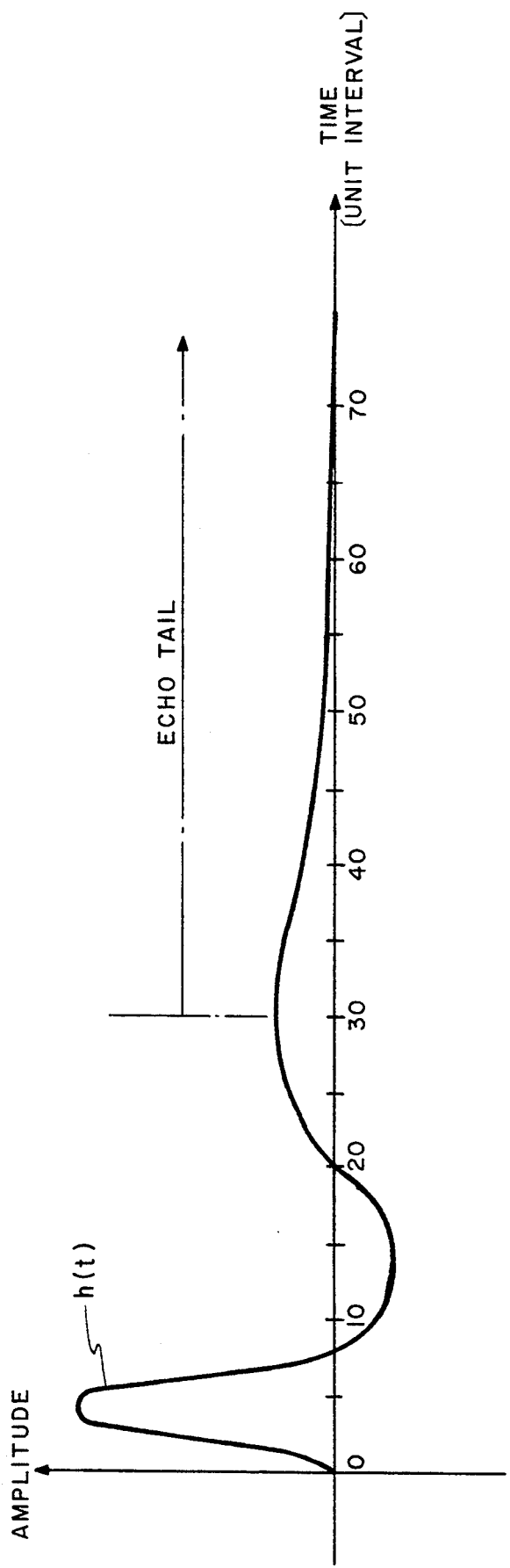
FIG. 4 shows an example of the impulse response of the echo canceller of the first and second embodiments of the present invention.

The low frequency component suppresser 12, which is installed in parallel with adaptive digital filter 11, comprises a multiplier 121, an adder 122 and a register 123 in order to suppress a low frequency component (refer to FIG. 4) contained in the echo replica signal at the tail of the impulse response of adaptive filter 11, with the result that the number of taps of adaptive filter 11 is effectively increased.

The hybrid circuit 16 includes a hybrid transformer 161 to connect the user side 1 to the network side 2 through transmission path 3, a matching impedance to match the output impedance of echo canceller 10 to the impedance looking from terminal equipment at user side 1 into transmission path 3 through transformer 161, two resistors 163 and 164, and an amplifier 165 to amplifyy the far end signal to be supplied to a receive signal line 5.

In the user side 1 constructed in the forementioned manner, a transmitting signal from a transmitter 14 is transmitted to transmission line 3 through transmitting signal line 4 and hybrid circuit 16. On this occasion, if the impedance looking from the secondary winding of transformer 161 into transmission path 3 is coincidence with the matching impedance 162, the output of amplifier 165 does not contain the echo signal in principle. In practice, however, the near end echo generates due to the slight impedance mismatch, so that the sum signal of this near end echo signal and far end signal from the user terminal connected through transformer 161 appears in the receive signal line 5. The filter 11 of echo canceller 10 generates an echo replica to be applied to subtracter 13. The subtracter 13 deletes a signal component corresponding to echo replica generated by adaptive filter 11 from the echo signal in the receive signal line 5, and then supplies a difference signal as a residual echo signal to the multiplier 260 of filter 11.

The residual echo signal is multiplied in multiplier 260 by a compensation coefficient $\alpha1$ for further suppression of residual echo. The compensation coefficient $\alpha1$ is previously set to be a proper value for associated system operation, which is stored in a memory circuit of a processor (not shown). As the coefficient $\alpha1$ increases, the operational stability of filter 11 increases, that is, the converging rate increases. However, since the residual echo increases due to the fluctuation of tap coefficient caused by far end signal, the residual echo suppression decreases. Conversely, as the coefficient $\alpha1$ decreases, the residual echo suppression increases, but the converging rate decreases. Usually, the maximum value is selected within a range to satisfy the required S/N ratio. The compensated residual echo signal is supplied to each of taps in filter 11. Each tap composed of two multipliers, register and adder updates the tap coefficient. For example, in the first tap having multipliers 220A, 230A, register 210A and adder 240A, a transmitting signal supplied in each time slot from an unit delay element 200A is multiplied in the multiplier 220A by the compensated residual echo signal and the multiplied product is added in the adder 240A as time varying correction value to the preceding tap coefficient read from the register 210A. The resultant sum is stored in the register 210A as updated tap coefficient, which is then multiplied in the multiplier 230A by an output of unit delay element 200A and applied to adder 250. Since the similar operation is performed in each of remaining other taps of filter 11, the adaptive updating of tap coefficient is realized by the utilization of the compensated residual echo signal.

Now, even if the suppression of the echo is performed in the forementioned manner, the compensated residual echo signal still contains a low frequency component. The low frequency component suppresser 12 is provided as substantial final tap for making effectively the number of taps of filter 11 to be 64 in order to suppress the low frequency component contained in the compensated echo signal. In the suppresser 12, the compensated residual echo signal is multiplied in the multiplier 121 by a compensation coefficient $\alpha2$. As the coefficient $\alpha2$ decreases, the impulse response of filter 11 followed by the low frequency component suppresser 12 becomes similar to the response of an adaptive filter with increased number of taps. In other words, an adaptive filter having the decaying characteristics of impulse response at tail portion can be realized so as to considerably suppress the low frequency component. Now, the setting of coefficient $\alpha2$ will be explained. In echo canceller 10, the adder 122 and register 123 of suppresser 12 work effectively as an integrator. It is assumed that x(t) and y(t) are an input from the line 5 to the subtracter 13 and an output from the subtracter 13 to the receiver 15 when a path is composed of subtracter 13, multiplier 260 of filter 11, multiplier 121 of suppresser 12 and integrator (adder 122 and register 123). An eq. (3) holds, $$y(t) = \alpha_1\alpha_2 \int_0^t y(t)dt + x(t) \quad (3)$$

By Laplace transform of eq. (3), we obtain eq. (4), $$Y = \alpha_1\alpha_2 \frac{1}{S} Y + X = \frac{1}{1 - \alpha_1\alpha_2 \frac{1}{S}} X = \frac{S}{S - \alpha_1\alpha_2} X, \quad (4)$$

from which the transfer characteristics $G(\omega)$ is obtained as follows, $$G(\omega) = \frac{j\omega}{j\omega - \alpha_1\alpha_2}. \quad (5)$$

The $G(\omega)$ shows effectively the characteristics of high pass filter with a cut-off frequency $f_c = \alpha_1\alpha_2/2\pi$. A position given by in the frequency axis is the cut-off frequency of a high pass filter composed of elements installed along above path. $\alpha_1$ is determined by the well-known criteria for convergence-time and residual echo of the transversal filter type adaptive digital filter. For details about the method to determine $\alpha_1$, reference is made to a paper entitled "A new digital echo canceller for two wire full duplex data transmission" by K. A. Muller, IEEE Transactions on Communications, Vol. COM-24, No. 9, pp. 956–962, September, 1976. The compensation coefficient $\alpha2$ is chosen relative to the compensation coefficient $\alpha1$ so that the cut-off frequency $(\alpha_1\alpha_2/2\pi)$ is sufficient to exclude the low frequency component contained in the residual echo signal. The initial value stored in register 123 is predetermined together with the compensation coefficient $\alpha2$ in such manner that the low frequency component suppresser 12 has the required characteristics. The product of multiplier 121 is supplied to adder 122 as adaptive control value for the preceding tap coefficient. The updated tap coefficient taken from register 123 is applied to adder 250 of filter 11 to suppress the low frequency component at tail of impulse response of filter 11.

Figure 3:
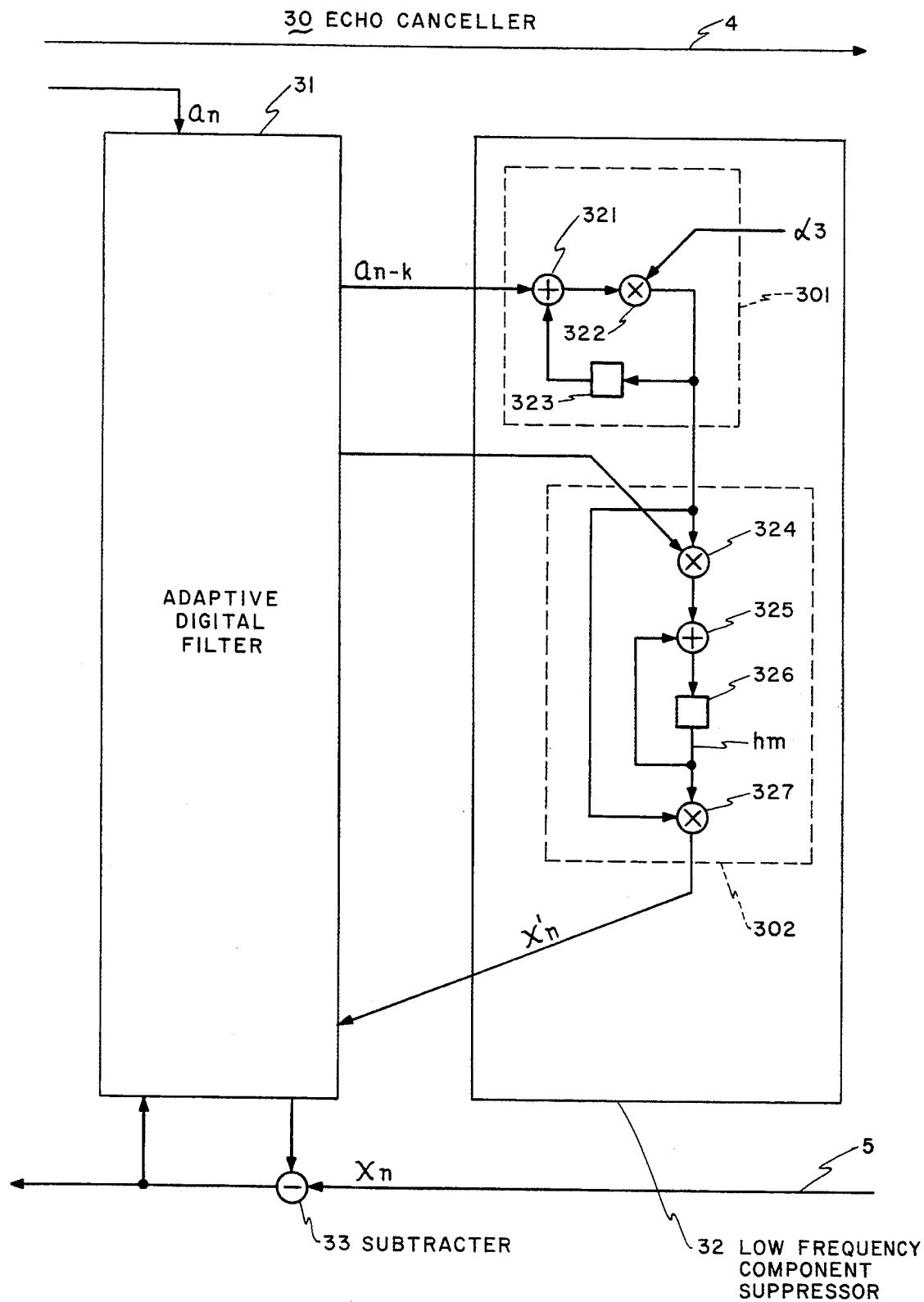
FIG. 3 shows the second embodiment of the present invention.

Now, another echo canceller according to the second embodiment of the present invention will be explained with reference to FIG. 3. An echo canceller 30 comprises an adaptive filter 31, a low frequency component suppresser 32 and a subtracter 33. As compared with adaptive filter 11 of the first embodiment of the invention, the adaptive filter 31 is identical to it except that the output $a_{n-k}$ of the unit delay element (200N in FIG. 2) composing the thirty-th tap is applied to the suppresser 32. Also, the structure of the subtracter 33 is the same as that of subtracter 13 of echo canceller 10. Therefore, the detailed explanation about the same constituent element will be omitted.

The low frequency component suppresser 32 comprises a transmitting low frequency component integrator 301 including an adder 321, a multiplier 322 and a register 323, and a tap-number increasing circuit 302 including a multiplier 324, an adder 325, a register 326 and a multiplier 327. The integrator 301 gives the filter 31 the response characteristics which are approximately identical to the exponential decaying characteristics (refer to FIG. 4) at tail of impulse response of a filter having 64 taps. The tap-number increasing circuit 302 works to suppress the level of the impulse response at tail portion. The integrator 301 generates a signal similar to the waveform at tail of impulse response of filter 31 by adding in the adder 321 the content of register 323 to the output $a_{n-k}$ of unit delay element (200N in FIG. 2) at final tap of filter 31 and then by multiplying the added result by a compensation coefficient $\alpha3$. On this occasion, the stored content of register 323 is the length of the tail determined by practical consideration. The value of the compensation coefficient α3 is predetermined corresponding to the magnitude of the low frequency component to be suppressed. Thus, the finite characteristics of impulse response at tail portion of a filter with 64 taps is approximately simulated.

Now, the setting of the compensation coeffieint α3 will be explained. The far end signal $X_n$ received at subtracter 33 from receive signal line 5 is given by, $$x_n = \sum_{k=0}^{\infty} a_{n-k} h_k, \tag{6}$$

where $a_n$ and $h_k$ denote a transmitted symbol of transmitting signal and impulse response of echo path, respectively. If the echo between 0 and m unit intervals (unit interval being 12.8 μsec, for example) is completely suppressed, the residual echo component $X_n'$ is given by, $$x_n' = \sum_{k=m+1}^{\infty} a_{n-k} h_k. \tag{7}$$

If the echo tail decays exponentially at more than m+1 unit interval, the impulse response is given by, $$h_k = h_m \exp(-P\,k). \tag{8}$$

By substituting eq. (8) into eq. (7), eq. (9) is derived as follows, $$x_n' = \sum_{k=m+1}^{\infty} a_{n-k}(h_m \exp(-Pk)) = \tag{9}$$

$$h_m \sum_{k=m+1}^{\infty} (a_{n-k} \exp(-Pk)).$$

In eq. (9), the multiplication factor for $h_m$ corresponds to the output of the integrator 301 of the low frequency component suppresser 32, which is composed of adder 321, multiplier 322 and register 323. Therefore, if the compensation coefficient α3 is made equal to exp(−PK) in eq. (9), a signal $X_n'$ is obtained at output of the tap-number increasing circuit 302 of the suppresser 32, with the result that the low frequency component of the residual echo signal can be realized.

Other alternatives and modification to the abovementioned embodiments can be made within the scope of the invention defined by the appended claims.

What is claimed is:

1. An echo canceller for a two-wire full duplex digital data transmission system comprising:
   an adaptive digital filter containing a transversal filter with a plurality of taps for generating an echo replica signal by estimating adaptively time-varying transfer characteristics of an echo path in order to suppress an echo signal from said echo path;
   means for producing a residual echo signal by obtaining the difference between said echo signal and said echo replica signal at a tail portion of an impulse response of said adaptive digital filter;
   low frequency component supressor means for suppressing low frequency components contained in said residual echo signal, said suppressor means being installed in parallel with the final stage of said adaptive digital filter to effectively increase the number of taps of said transversal filter, said suppressor means including:
   first order recursive filter means responsive to said residual echo signal and an output from said final stage of said adaptive digital filter for producing a waveform of said low frequency components, tap coefficient updating means responsive to said waveform of said low frequency components and said residual echo signal for updating a tap coefficient to produce an updated tap coefficient, and
   first multiplier means for multiplying said waveform of said low frequency components by said updated tap coefficient to produce a low frequency component replica which is used to cancel said low frequency components.

2. An echo canceller of claim 1, for two-wire full duplex digital data transmission system, wherein said first order recursive filter means comprises:
   first adder means for adding said output from said final state of said adaptive digital filter to a delayed waveform of said low frequency components and for outputting a resultant sum,
   second multiplier means for multiplying a compensation coefficient by said resultant sum to produce said waveform of said low frequency components, and
   holding means for holding said waveform of said low frequency components to produce said delayed waveform of said low frequency component.

3. An echo canceller of claim 1 for two-wire full duplex digital data transmission system, wherein said tap coefficient updating means comprises:
   second multiplier means (324) for multiplying said waveform of said low frequency components by said residual echo signal from said adaptive digital filter;
   second adder means (325) for adding a resultant product from said second multiplier means to said updated tap coefficient and for outputting a resultant sum as said updated tap coefficient; and
   third means for holding said updated tap coefficient and for outputting said updated tap coefficient to said first multiplier means.

* * * * *